US006816954B2

(12) United States Patent
Solomon

(10) Patent No.: US 6,816,954 B2
(45) Date of Patent: Nov. 9, 2004

(54) SYSTEM AND METHOD FOR TUNING RETRY PERFORMANCE

(75) Inventor: Richard L. Solomon, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 206 days.

(21) Appl. No.: 10/207,283

(22) Filed: Jul. 29, 2002

(65) Prior Publication Data

US 2004/0019755 A1 Jan. 29, 2004

(51) Int. Cl.[7] .............................................. G06F 12/00
(52) U.S. Cl. ...................... 711/167; 711/111; 710/39
(58) Field of Search ................................ 711/167, 111; 710/39; 1/112

(56) References Cited

U.S. PATENT DOCUMENTS

| | | | | |
|---|---|---|---|---|
| 5,884,052 A | * | 3/1999 | Chambers et al. | 710/107 |
| 6,081,859 A | * | 6/2000 | Munguia | 710/107 |
| 6,282,598 B1 | * | 8/2001 | Manabe | 710/107 |
| 6,289,406 B1 | * | 9/2001 | Chambers et al. | 710/107 |
| 6,633,936 B1 | * | 10/2003 | Keller et al. | 710/107 |

* cited by examiner

Primary Examiner—Matthew Kim
Assistant Examiner—Shane Thomas
(74) Attorney, Agent, or Firm—Suiter West PC LLO

(57) ABSTRACT

The present invention is directed to a system and method for tuning retry performance of read requests of data from electronic data storage devices. In an aspect of the present invention, a method for performing a delayed read in an electronic data storage system having an initiator and a target device may include initiating a delayed read by the initiator to the target device and issuing at least one delayed read. The initiator then delays for a programmed interval before reissuing the at least one delayed read.

18 Claims, 5 Drawing Sheets

US 6,816,954 B2

SYSTEM AND METHOD FOR TUNING RETRY PERFORMANCE

FIELD OF THE INVENTION

The present invention generally relates to the field of electronic devices, and particularly to a system and method for tuning retry performance of read requests of data from electronic data storage devices.

BACKGROUND OF THE INVENTION

The storage of data in an electronic format has been one of the driving forces of the increased efficiency and productivity of modern life. From business to personal use, people increasingly rely on electronic data storage to store ever greater amounts of data. Because of the increased amounts of data, efficiencies realized in electronic data storage may be multiplied through a wide range of areas using these data storage techniques.

One such area that may be improved is the access of electronic data. Because of the large amounts of data, significant time may be required to fetch data from a storage medium. Such delays may result in the system waiting for the data, instead of performing other desired functions for a user. The delays may be further magnified by the sheer number of data accesses required to perform even simple tasks on an information handling system. Therefore, any efficiency realized in the fetching of data may be greatly magnified by the great number of accesses required in even a typical information handling system.

Therefore, it would be desirable to provide a system and method for tuning retry performance of read requests of data from electronic data storage devices.

SUMMARY OF THE INVENTION

Accordingly, the present invention is directed to a system and method for tuning retry performance of read requests of data from electronic data storage devices. In an aspect of the present invention, a method for performing a delayed read in an electronic data storage system having an initiator and a target device includes initiating a delayed read by the initiator to the target device and issuing at least one delayed read. The initiator then delays for a programmed interval before reissuing the at least one delayed read.

In an additional aspect of the present invention, an electronic data storage system includes an initiator suitable for requesting data and a target device suitable for storing data electronically, the target device communicatively coupled to the initiator utilizing a bus. A delayed read is initiated by the initiator to the target device and at least one delayed read is issued. The initiator delays for a programmed interval before reissuing the at least one delayed read.

In a further aspect of the present invention, a method for performing a delayed read in an electronic data storage system having an initiator and a target device includes initiating a delayed read sequence by the initiator to the target device and issuing a sequence of delayed reads. The initiator then delays for a programmed interval before reissuing at least one delayed read of the sequence of delayed reads.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1A through 5, exemplary embodiments of the present invention are shown. Because of the large amounts of data stored and the number of requests typically required to access data in even simple tasks on an information handling system, efficiencies realized in the fetching of data may be greatly magnified by the great number of accesses required in even a typical information handling system.

Figure 1A:
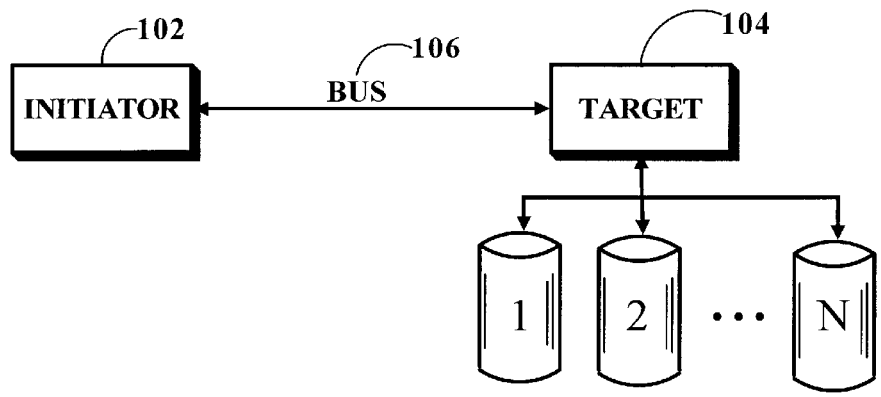
FIG. 1A is a block diagram of an exemplary system operable to employ the present invention.

Referring now to FIG. 1A, an exemplary embodiment 100 of the present invention is shown wherein an initiator initiates a read to obtain data from a target device. An initiator 102 initiates a read from a target device 104 over a bus 106. An initiator 102 may include an interface controller, such as a bus interface controller and the like as contemplated by a person of ordinary skill in the art. Target devices 104 may include a variety of electronic data storage devices, from "plain" hard-disk drives to multiple data storage devices having a host bridge, and the like. Previously, reads were performed utilizing either a real time read or as a delayed read. The delayed read method was used so that, instead of inserting a wait state while waiting for return data as in a real time read, the initiator used a retry to free the bus for other accesses. The data was returned to the initiator with a zero wait time in a subsequent read. Thus, real-time reads were suitable for reading devices that had a small read latency, while delayed reads were used for higher latency devices. However, such delayed reads resulted in inefficiencies due to the inability to manage the delay of the reads. The present invention provides a system and method for managing the delays so there is improved and efficient utilizing of the initiator 102, bus 106 and target 104.

Figure 1B:
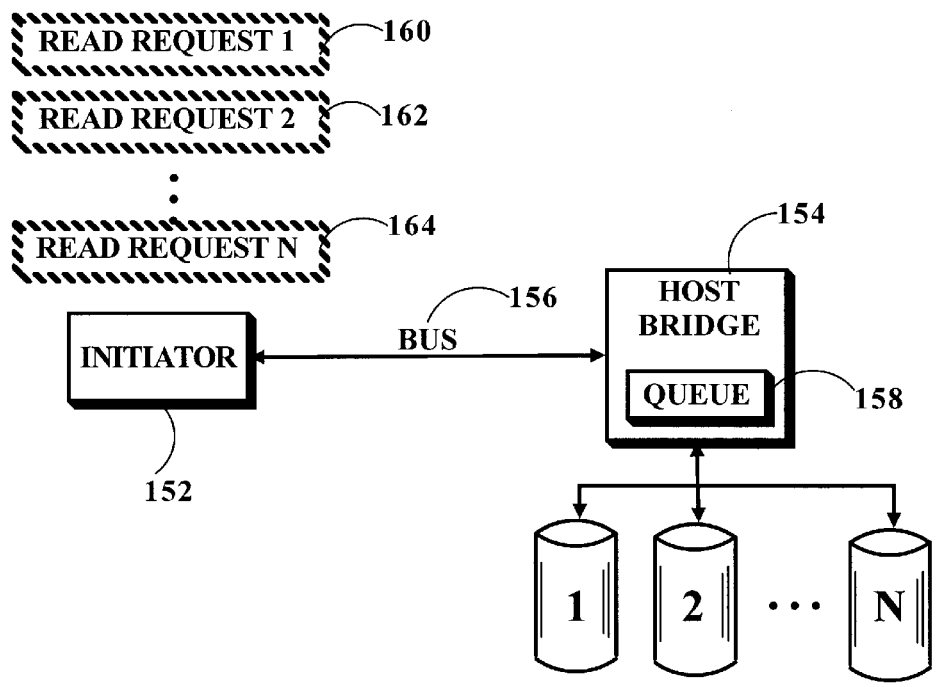
FIG. 1B is a block diagram of an embodiment of the present invention wherein multiple read requests are queued by a host bridge and a delay inserted after a last request in the sequence to improve efficiency of retrieving the data.

For instance, while complex targets, such as host bridges, are capable of enqueuing multiple read requests, the initiating devices must continue to retry all requests in order to retrieve the data when the data becomes available, as shown in the embodiment 150 shown in FIG. 1B. An initiator 152 is communicatively coupled to a host bridge 154 over a bus 156, such as a PCI bus and the like. The host bridge 154 includes a queue 158 and is capable of enqueuing multiple read requests. To retrieve the requested data, the initiator 152 must continue to retry the requests 160, 162 & 164 in order to obtain the data from the host bridge 154 when it becomes available. However, previously, the overhead of managing multiple read requests 160, 162 & 164 on the initiator 152 generates an undesirably high latency for a particular retry.

For example, for a target's data availability time T, and initiator retry time R, the availability time T, may equal some fractional multiplier of R, such as T=2.1*R. However, the initiator's effective availability must be an integer multiple R, so $T_{eff}$=3*R. Previous approaches toward rectifying this problem involved reducing overall latency of the device, which is impractical to reduce to a large extent, or to accept $T_{eff}$=3*R, which may degrade performance substantially, especially when R is large in relation to T. In an embodiment of the present invention, performance is improved by inserting a delay after issuing the final retry in a sequence and before restarting the sequence so as to effectively manage availability of the bus 156 and the data flow.

Figure 2:
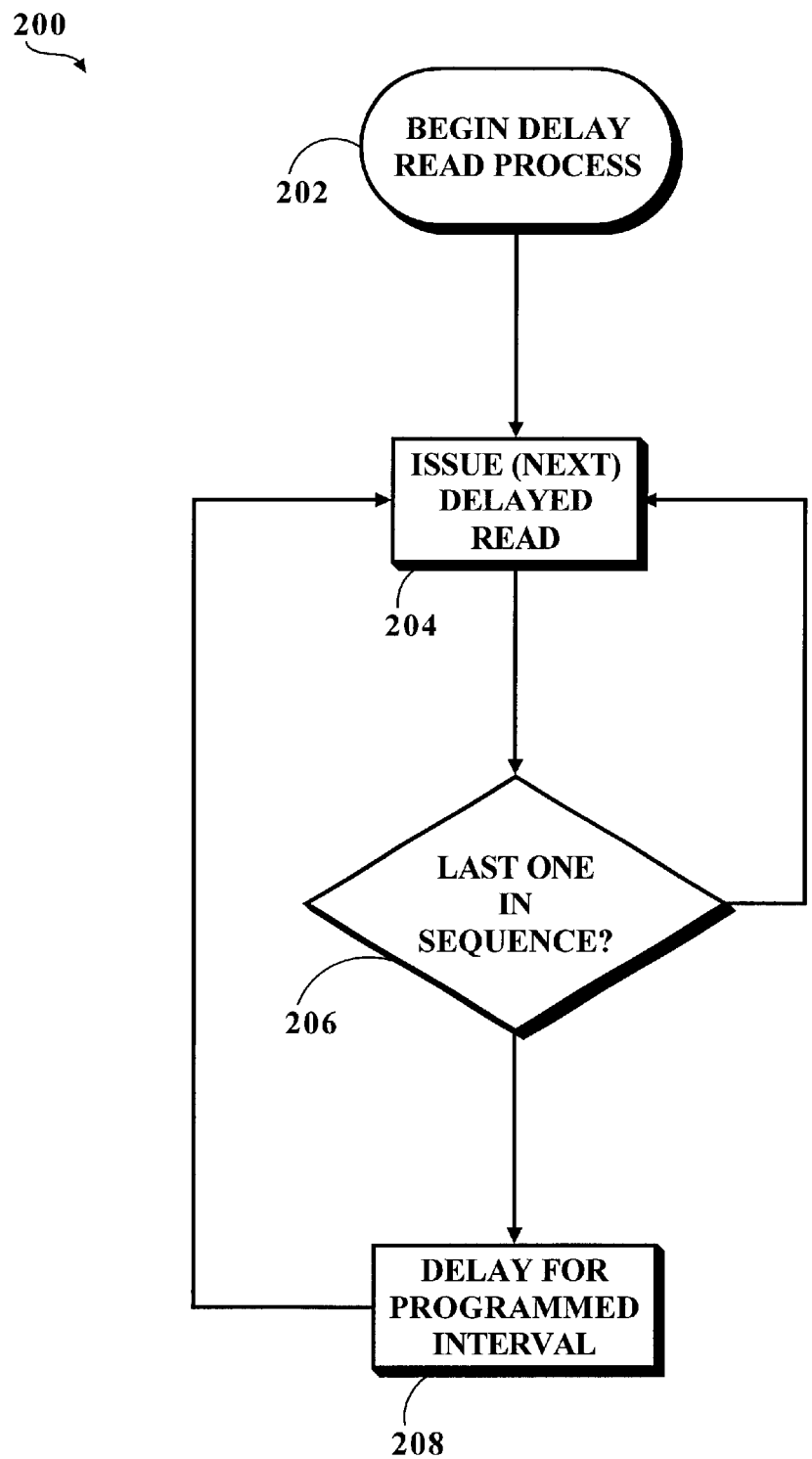
FIG. 2 is a flow chart illustrating an exemplary method of the present invention wherein a programmed interval is utilized to delay subsequent reads of a delayed read.

Referring now to FIG. 2, an exemplary method 200 of the present invention is shown wherein a programmable delay is utilized to tune retry performance. A delayed read process is begun 202 by an initiator to a target. Thus, the bus is made available during data retrieval by the target. Delayed reads are issued by the initiator 204, which may include a single read or a plurality of reads in sequence. A determination is made as to whether the read was the last read in a sequence 206. For instance, the initiator may detect that a read previously issued by the initiator is due to be reissued.

Upon detecting that the read is the last one in the sequence, the initiator delays for a programmed interval 208 before issuing, which is actually reissuing, the delayed read for retrieval of data from the device. In this way, the present invention may be tailored so that the retry time R corresponds generally with the availability time T. Even in instances in which there is not a one-to-one correspondence of the retry time with the availability time, it is contemplated that the time may be tailored to retrieve the data at a time which generally corresponds with the availability of the data, rather than the happenstance continual retrying of multiple reads as was previously performed. In an embodiment of the invention, the value of the delay is programmed externally to empirically derived values that match a given system. In further embodiments of the present invention, the delay term may be computed dynamically to coincide with the requirements of the multiple reads being utilized.

Figure 3:
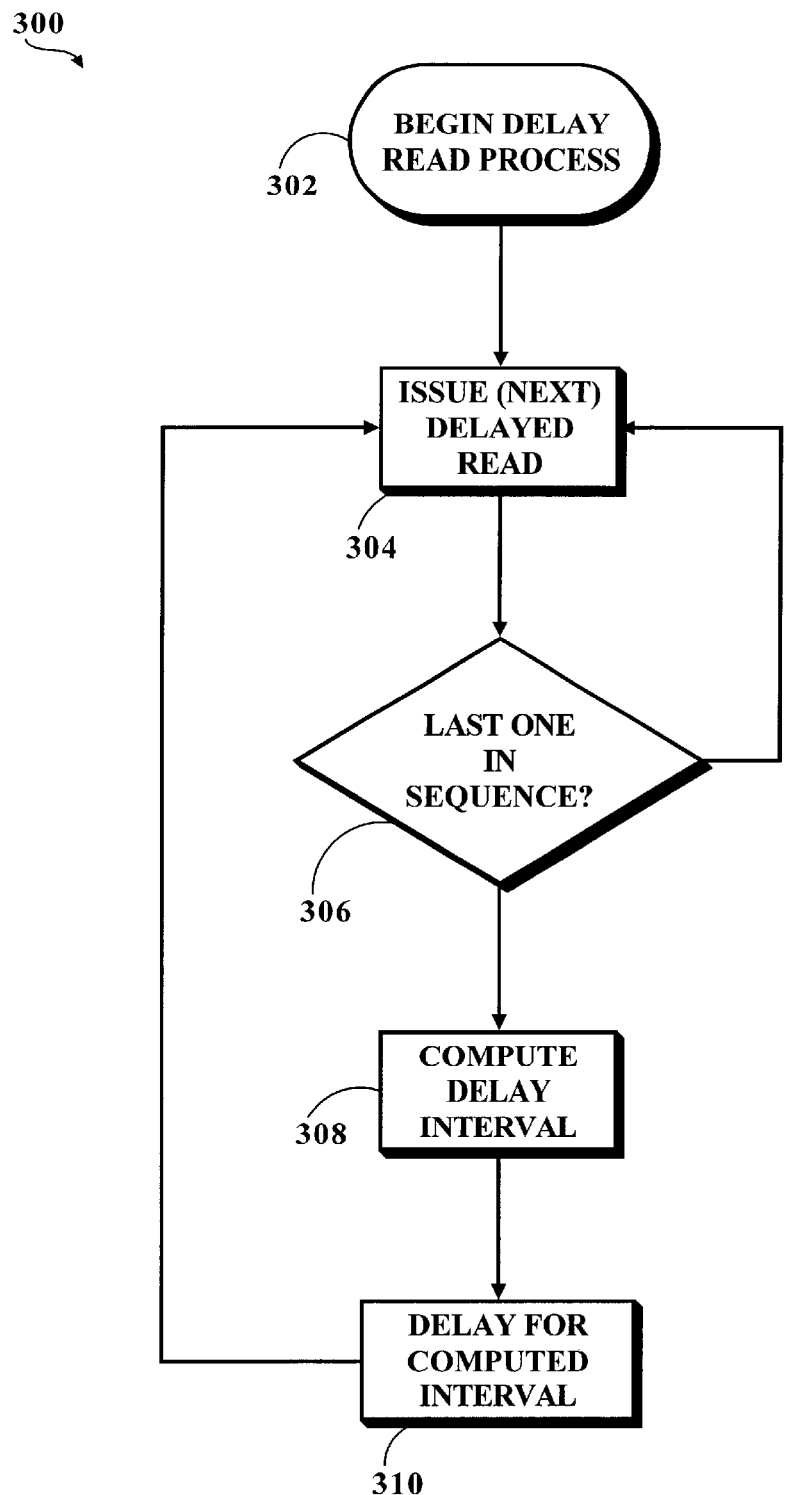
FIG. 3 is a flow chart depicting an exemplary method of the present invention wherein a programmable delay included in a delayed read system is computed dynamically.

Referring now to FIG. 3, an exemplary method 300 of the present invention is shown wherein a programmable delay included in a delayed read system is computed dynamically. As before, a delay read process is begun 302 and a read is issued 304. A determination is made as to whether the last read in a sequence was issued 306 as contemplated by a person of ordinary skill in the art.

A delay interval for waiting after the last read in the sequence before reissuing the delayed read is computed 308. Preferably, the delay is computed so that T generally corresponds to R for the read requests reissued after the programmed delay 310. Thus, the try interval R is lengthened to provide an integer multiple match to data availability time T, so T=n*R. For instance, an existing PCI interface core may be tuned to a given availability time T reducing $T_{eff}$ from n*R to (n−1)R. For a given example T=2.1R and $T_{eff}$=3*R, a new retry interval R' would be created where R'=1.05*R, the $T_{eff}$'=2*R'=2.1R, reducing $T_{eff}$ by thirty percent.

Such a delay may be computed utilizing a variety of methods as contemplated by a person of ordinary skill in the art without departing from the spirit and scope of the present invention, such as through use of minimum and/or maximum threshold delay times, and the like.

Figure 4:
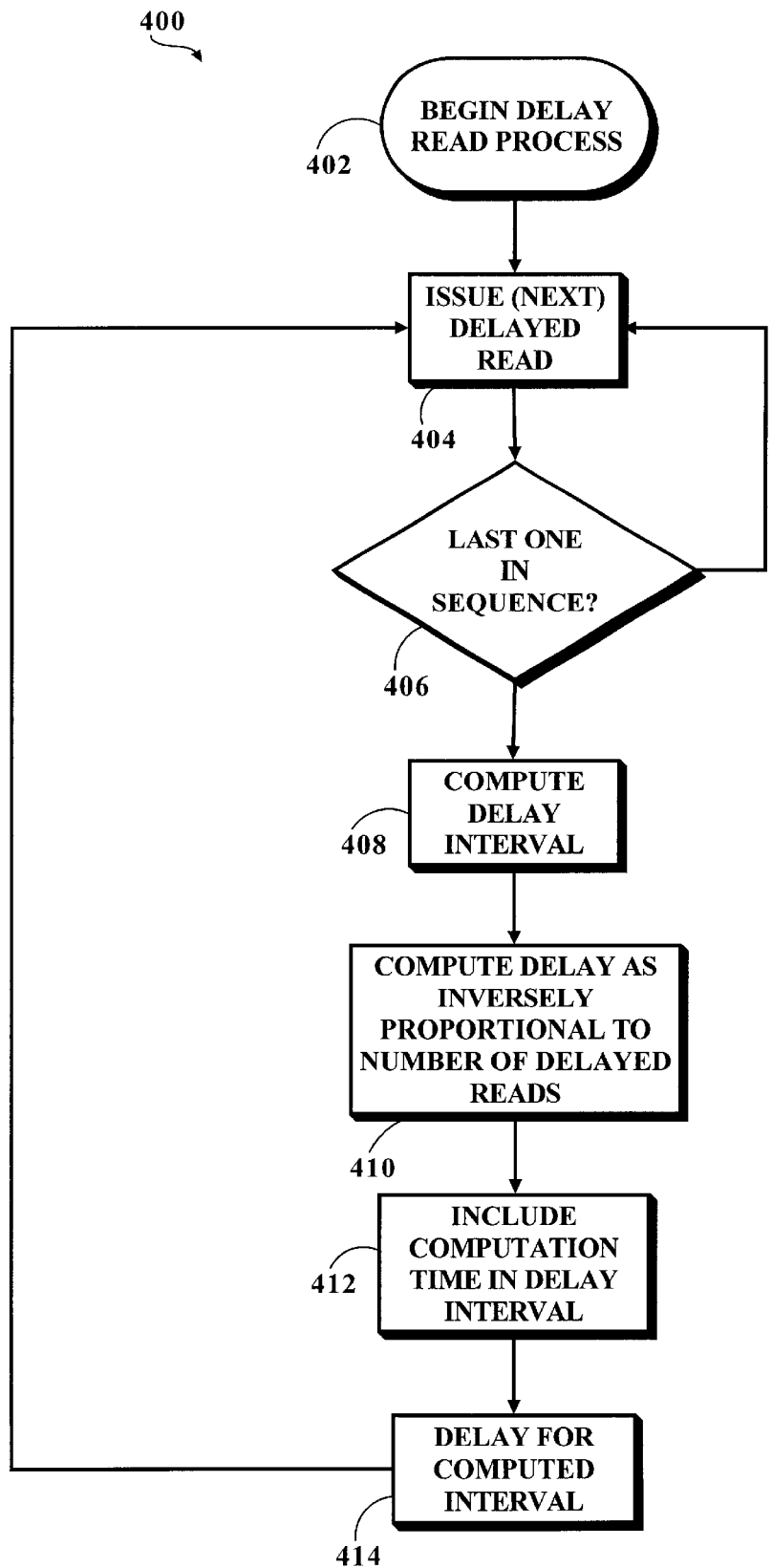
FIG. 4 is a flow chart of an exemplary method of the present invention wherein a programmable delay included in a delayed read system is computed as inversely proportional to the number of reads.
Figure 5:
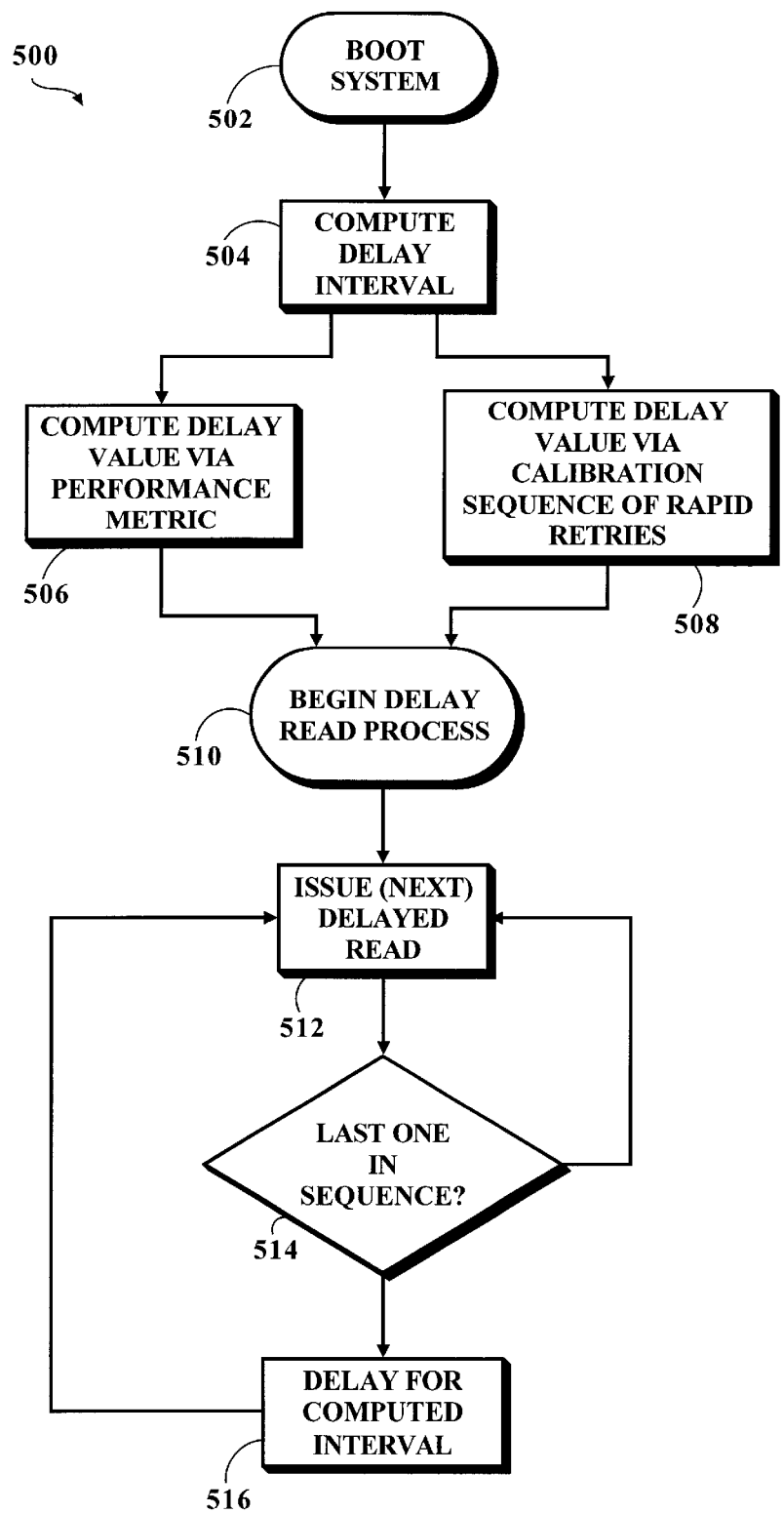
FIG. 5 is a flow diagram of an exemplary method of the present invention wherein a programmable delay is computed before issue of a delayed read.

Referring now to FIG. 4, an exemplary method 400 of the present invention is shown wherein a programmable delay included in a delayed read system is computed utilizing a variety of methods. A delayed read process is begun 402 and delayed read(s) are issued 404. A determination is made as to whether the last read in a sequence, even a sequence of one, has been issued 406. If so, the delay interval is computed 408. Computing the delay interval may include computing as inversely proportional to number of delay reads 410, utilizing minimum and/or maximum delay values as previously described, and the like. For example, a delay may be issued as having a few (in number) reads (even one). The system may calculate that the delay is about to be reissued too early, and delay longer as opposed to a delay inserted in the event that a large number of reads were issued. In some instances, the computation may indicate that a delay is not necessary, such as the computation of the delayed read in effect created the desired delay, the number of multiple reads supplies a desired delay, and the like. In such instances, a delay of zero may be utilized. Thus, the present invention may even utilize the computation time of the delay interval as a part of the delay interval 412. The system may then delay for the computed interval 414 and start reissuing delays as before 404.

A delay may also be computed before issuance of the delayed read. For example, referring now to FIG. 5, an exemplary method 500 of the present invention is shown wherein delays are computed before issuance of a read. A system is booted 502 and a delay interval computed 504. The delay interval may be computed utilizing a variety of methods, such as computed via a performance metric 506, via calibration sequence of rapid retries 508, and the like without departing from the spirit and scope of the present invention. Thus, the delayed read process may begin 510, and delayed reads issued 512. After the last delayed read in a sequence is issued 514, the system may delay for the interval 516 as previously computed 504. Such a method may be desirable in more standardized systems in which the delay needed would be generally uniform, so that computational resources are freed for other uses.

Although computation of the delay interval is shown as occurring after issuance of the last read of a sequence, it should be apparent that the delay may be computed at a variety of times without departing from the spirit and scope of the present invention, such as during the issuance of the reads, before issuance of the reads, and the like as contemplated by a person of ordinary skill in the art.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for tuning retry performance of read requests of data from electronic data storage devices of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for performing a delayed read in an electronic data storage system having an initiator and a target device, comprising:

initiating a delayed read by the initiator to the target device;

issuing at least one delayed read;

computing a programmed interval; and delaying for the programmed interval before reissuing the at least one delayed read, wherein the programmed interval is computed taking into account computation time of the interval.

2. The method as described in claim 1, wherein the delay is performed after a last delayed read of a sequence of delayed reads is performed.

3. The method as described in claim 1, wherein the programmed interval is computed as at least one of externally to empirically derived values that match a given system and before initiation of a delayed read.

4. The method as described in claim 1, wherein the programmed interval is computed so that initiator retry time R generally corresponds to a target's data availability time T.

5. The method as described in claim 1, wherein the programmed interval is computed dynamically.

6. The method as described in claim 1, wherein the programmed interval is computed by at least one of threshold delay time, performance metric, calibration sequence of rapid retries and as inversely proportional to a number of delayed reads.

7. An electronic data storage system, comprising:

an initiator suitable for requesting data;

a target device suitable for storing data electronically, the target device communicatively coupled to the initiator utilizing a bus;

wherein a delayed read is initiated by the initiator to the target device and at least one delayed read is issued, the initiator delays for a computed programmed interval before reissuing the at least one delayed read, wherein the computed programmed interval is computed taking into account computation time of the interval.

8. The data storage system as described in claim 7, wherein the delay is performed after a last delayed read of a sequence of delayed reads is performed.

9. The data storage system as described in claim 7, wherein the programmed interval is computed as at least one of externally to empirically derived values that match a given system and before initiation of a delayed read.

10. The data storage system as described in claim 7, wherein the programmed interval is computed so that initiator retry time R generally corresponds to a target's data availability time T.

11. The data storage system as described in claim 7, wherein the programmed interval is computed dynamically.

12. The data storage system as described in claim 7, wherein the programmed interval is computed by at least one of threshold delay time, performance metric, calibration sequence of rapid retries and as inversely proportional to a number of delayed reads.

13. A method for performing a delayed read in an electronic data storage system having an initiator and a target device, comprising:

initiating a delayed read sequence by the initiator to the target device;

issuing a sequence of delayed reads;

computing a programmed interval;

delaying for the programmed interval before reissuing at least one the delayed reads of the sequence of delayed reads, wherein the programmed interval is computed taking into account computation time of the interval.

14. The method as described in claim 13, wherein the delay is performed after a last delayed read of a sequence of delayed reads is performed.

15. The method as described in claim 13, wherein the programmed interval is computed as at least one of externally to empirically derived values that match a given system and before initiation of a delayed read.

16. The method as described in claim 13, wherein the programmed interval is computed so that initiator retry time R generally corresponds to a target's data availability time T.

17. The method as described in claim 13, wherein the programmed interval is computed dynamically.

18. The method as described in claim 13, wherein the programmed interval is computed by at least one of threshold delay time, performance metric, calibration sequence of rapid retries and as inversely proportional to a number of delayed reads.

* * * * *